United States Patent
Zhang et al.

(10) Patent No.: US 11,677,525 B2
(45) Date of Patent: Jun. 13, 2023

(54) METHOD FOR TRANSMITTING REFERENCE SIGNAL

(71) Applicant: Telefonaktiebolaget LM Ericsson (publ), Stockholm (SE)

(72) Inventors: Zhan Zhang, Beijing (CN); Majid Gerami, Lund (SE); Niklas Andgart, Södra Sandby (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 180 days.

(21) Appl. No.: 17/228,300

(22) Filed: Apr. 12, 2021

(65) Prior Publication Data

US 2021/0234653 A1    Jul. 29, 2021

Related U.S. Application Data

(63) Continuation of application No. 16/088,891, filed as application No. PCT/CN2018/085342 on May 2, 2018, now Pat. No. 10,999,029.

(30) Foreign Application Priority Data

Aug. 11, 2017  (WO) ................ PCT/CN2017/097238

(51) Int. Cl.
*H04L 5/00*     (2006.01)
*H04W 4/70*     (2018.01)

(52) U.S. Cl.
CPC .......... *H04L 5/0048* (2013.01); *H04L 5/0007* (2013.01); *H04L 5/0051* (2013.01); *H04W 4/70* (2018.02)

(58) Field of Classification Search
None
See application file for complete search history.

(56) References Cited

U.S. PATENT DOCUMENTS 10,805,913 B2 * 10/2020 Yi .......................... H04L 5/0064
10,999,029 B2 *  5/2021 Zhang ................... H04L 5/0051
(Continued)

FOREIGN PATENT DOCUMENTS

CN    103248469 A    8/2013
CN    106534001 A    3/2017
(Continued)

OTHER PUBLICATIONS

Author Unknown, "Technical Specification Group Radio Access Network; Evolved Universal Terrestrial Radio Access (E-UTRA); Physical channels and modulation (Release 10)," Technical Specification 36.211, Version 10.0.0, Dec. 2010, 3GPP Organizational Partners, 103 pages.

(Continued)

*Primary Examiner* — Faiyazkhan Ghafoerkhan
(74) *Attorney, Agent, or Firm* — Withrow & Terranova, PLLC

(57) ABSTRACT

According to the present disclosure, behaviors of a Base Station (BS) and a User Equipment (UE) pertinent to Reference Signal (RS) transmissions are discussed. BS may configure RS corresponding to a set of antenna ports in two or more groups of Orthogonal Frequency Division Multiplexing (OFDM) symbols on a short Physical Downlink Sharing CHannel (sPDSCH), where subcarrier indices used for RS transmission are different between at least two groups of OFDM symbols. Then, BS may transmit the RS to UE. UE will receive RS and perform channel estimation based on the received RS.

18 Claims, 14 Drawing Sheets

(56) References Cited

U.S. PATENT DOCUMENTS

| | | | |
|---|---|---|---|
| 2012/0039287 A1 | 2/2012 | Ko et al. | |
| 2017/0099127 A1* | 4/2017 | Byun | H04L 5/0053 |
| 2017/0149542 A1* | 5/2017 | Lee | H04L 5/0048 |
| 2017/0171842 A1* | 6/2017 | You | H04L 5/0082 |
| 2017/0317794 A1* | 11/2017 | You | H04L 5/0051 |
| 2018/0227912 A1* | 8/2018 | Chen | H04L 5/0048 |
| 2018/0375636 A1* | 12/2018 | You | H04W 72/20 |
| 2019/0028162 A1* | 1/2019 | Lee | H04B 7/0639 |
| 2019/0075582 A1* | 3/2019 | Kim | H04L 1/1607 |
| 2019/0098608 A1* | 3/2019 | Yi | H04L 5/00 |
| 2019/0268924 A1* | 8/2019 | Kim | H04W 72/04 |
| 2019/0289586 A1* | 9/2019 | Ouchi | H04W 88/02 |
| 2019/0297601 A1* | 9/2019 | You | H04W 72/23 |
| 2019/0297602 A1* | 9/2019 | You | H04L 1/0026 |
| 2019/0312695 A1* | 10/2019 | Zhang | H04L 5/0007 |
| 2019/0373560 A1* | 12/2019 | Ouchi | H04W 72/23 |
| 2021/0234653 A1* | 7/2021 | Zhang | H04L 5/0051 |

FOREIGN PATENT DOCUMENTS

| | | |
|---|---|---|
| CN | 106788930 A | 5/2017 |
| CN | 106998247 A | 8/2017 |
| WO | 2011102683 A1 | 8/2011 |
| WO | 2013077657 A1 | 5/2013 |
| WO | 2014069958 A1 | 5/2014 |
| WO | 2017019132 A1 | 2/2017 |
| WO | 2017090708 A1 | 6/2017 |
| WO | 2017122959 A1 | 7/2017 |

OTHER PUBLICATIONS

LG Electronics, "R1-1707552: Discussion on DL DMRS for sTTI," 3GPP TSG RAN WG1 Meeting #89, May 15-20, 2017, Hangzhou, China, 7 pages.
Sharp, "R1-162843: Link level evaluation results of shortened TTI for DM-RS based PDSCH," 3GPP TSG RAN WG1 Meeting #84bis, Apr. 11-15, 2016, Busan, Korea, 7 pages.
Sharp, "R1-163400: Link level evaluation results of shortened Tti for DM-RS based PDSCH," 3GPP TSG RAN WG1 Meeting #84bis, Apr. 11-15, 2016, Busan, Korea, 7 pages.
Spreadtrum Communications, "R1-1608915: Discussion on DL RS design for sTTI," 3GPP TSG RAN WG1 meeting #86bis, Oct. 10-14, 2016, Lisbon, Portugal, 4 pages.
Non-Final Office Action for U.S. Appl. No. 16/088,891, dated Mar. 19, 2020, 11 pages.
Final Office Action for U.S. Appl. No. 16/088,891, dated Sep. 29, 2020, 11 pages.
Advisory Action for U.S. Appl. No. 16/088,891, dated Dec. 8, 2020, 3 pages.
Notice of Allowance for U.S. Appl. No. 16/088,891, dated Jan. 8, 2021, 8 pages.
First Office Action for Chinese Patent Application No. 201880000786.3, dated Feb. 26, 2021, 15 pages.
Notification of Reason for Refusal for Korean Patent Application No. 10-2020-7003569, datd Mar. 5, 2021, 9 pages.
Extended European Search Report for European Patent Application No. 18730961.2, dated Oct. 29, 2019, 10 pages.
Examination Report for European Patent Application No. 18730961.2, dated Apr. 30, 2020, 7 pages.
Examination Report for European Patent Application No. 18730961.2, dated Oct. 29, 2020, 9 pages.
Examination Report for Indian Patent Application No. 201847023879, dated Jun. 16, 2020, 7 pages.
International Search Report and Written Opinion for International Patent Application No. PCT/CN2018/085342, dated Jul. 27, 2018, 8 pages.
CATT, "R1-1702054: Discussion on DMRS design for DL sTTI," 3GPP TSG RAN WG1 Meeting #88, Feb. 13-17, 2017, Athens, Greece, 17 pages.
Huawei, et al., "R1-1706995: DL DMRS design for short TTI," 3GPP TSG RAN WG1 Meeting #89, May 15-19, 2017, Hangzhou, China, 9 pages.
Zte, et al., "R1-1701975: DL DMRS design in sTTI," 3GPP TSG RAN WG1 Meeting #88, Feb. 13-17, 2017, Athens, Greece, 5 pages.
Examination Report for Canadian Patent Application No. 3,072,677, dated Jun. 23, 2021, 5 pages.
Summons to Attend Oral Proceedings for European Patent Application No. 18730961.2, mailed May 4, 2021, 10 pages.
Notice of Reasons for Rejection for Japanese Patent Application No. 2020-506872, dated Jun. 22, 2021, 8 pages.
LG Electronics, "R1-1704834: Discussion on DL DMRS design for sTTI," 3GPP TSG RAN WG1 Meetig #8 8-bis, Apr. 3-7, 2017, Spokane, Washington, 7 pages.
Examination Report for Canadian Patent Application No. 3,072,677, dated Aug. 2, 2022, 4 pages.
Second Office Action for Chinese Patent Application No. 201880000786.3, dated Nov. 3, 2021, 14 pages.
Office Action for Indonesian Patent Application No. P00202001366, dated Oct. 29, 2022, 6 pages.
Decision to Grant for Japanese Patent Application No. 2020-506872, dated Jan. 25, 2022, 5 pages.
Written Decision on Registration for Korean Patent Application No. 10-2020-7003569, dated Sep. 15, 2021, 4 pages.

* cited by examiner

METHOD FOR TRANSMITTING REFERENCE SIGNAL

This application is a continuation of U.S. patent application Ser. No. 16/088,891, filed Sep. 27, 2018, now U.S. Pat. No. 10,999,029, which is a 35 U.S.C. § 371 national phase filing of International Application No. PCT/CN2018/085342, filed May 2, 2018, which claims the benefit of International Application No. PCT/CN2017/097238, filed Aug. 11, 2017, the disclosures of which are incorporated herein by reference in their entireties.

TECHNICAL FIELD

The present disclosure generally relates to the technical field of wireless communications, and particularly to behaviors of a Base Station (BS) and a User Equipment (UE) pertinent to Reference Signal (e.g., User Equipment (UE)-specific Reference Signal (UE-RS)) transmissions.

BACKGROUND

In $3^{rd}$ Generation Partnership Projection (3GPP), it is being discussed how to enhance the current mobile communication systems to provide means of communication between a wide range of machines. A subgroup of this is Critical Machine-Type Communication (CMTC) where the communication requirements of very low latency, very high reliability and very high availability must be fulfilled. Example use-cases are:
  Factory automation, where actuators, sensors and control systems communicate with each other. Typical requirement is 1 ms latency.
  Motion control within construction robots, 1 ms latency
  Remote control of machines, 5-100 ms latency,
  Smart energy grids, 3-5 ms
  Performance enhancement regarding TCP/IP Slow-start issue Candidate communication systems for fulfilling such requirements and use-cases are Long Term Evolution (LTE) and a newly developed radio access solution, which is called New Radio (NR) by 3GPP, for example.

In short Transmission Time Interval (sTTI) concept, a scheduling unit is defined as either a regular slot (1 ms) TTI or an sTTI (<1 ms). An sTTI slot can consist of one or several consecutive Orthogonal Frequency Division Multiplexing (OFDM) symbols. One possible outcome is that a slot consists of 2 or 7 OFDM symbols, but other structures, e.g., of less than 14 OFDM symbols, can be envisioned as well.

Furthermore, sTTI-enabled UEs may support different types of traffic depending on the application requirements. One such example is the co-existence of enhanced Mobile BroadBand (eMBB) communications and low-latency traffic.

SUMMARY

Owing to the shorter TTIs, an existing regular TTI RS (e.g., UE-RS or DeModulation Reference Signal (DMRS)) does not perform as well as in the regular TTI cases. The sTTI scenario includes different lengths in current 3GPP discussion, 2/3 OFDM symbols (2/3OS), and slot-based sTTI. Their transport block spreading over time are shorter than non-sTTI ones. Performance of the Downlink (DL) RS (e.g., DMRS) should be re-evaluated and RS (e.g., UE-RS or DMRS) patterns within different sTTIs also should be adjusted/redesigned for a best tradeoff between the channel estimation accuracy and overhead incurred. It should be noted that the terms "UE-RS" and "DMRS" can be interchangeably used in the present disclosure.

According to a first aspect of the present disclosure, there may be provided a method in a base station, comprising: configuring User Equipment (UE)-specific Reference Signal (UE-RS) corresponding to a set of antenna ports in two or more groups of Orthogonal Frequency Division Multiplexing (OFDM) symbols on a short Physical Downlink Sharing CHannel (sPDSCH), where subcarrier indices used for UE-RS transmission are different between at least two groups of OFDM symbols; and transmitting the UE-RS to a user equipment.

According to a second aspect of the present disclosure, there may be provided a method in a user equipment, comprising: receiving User Equipment (UE)-specific Reference Signal (UE-RS) from a base station, where the UE-RS corresponding to a set of antenna ports are configured in two or more groups of Orthogonal Frequency Division Multiplexing (OFDM) symbols on a short Physical Downlink Sharing CHannel (sPDSCH), and subcarrier indices used for UE-RS transmission are different between at least two groups of OFDM symbols; and performing channel estimation based on the received UE-RS.

In one example, the at least two groups of OFDM symbols may be configured in different short Transmission Time Intervals (sTTIs).

In one example, the number of subcarriers used for UE-RS transmission in each group of OFDM symbols may be dependent on a length of an sTTI to which the group of OFDM symbols belongs.

In one example, the subcarriers used for UE-RS transmission in each group of OFDM symbols may be evenly distributed.

In one example, for a first group of OFDM symbols in a first sTTI having a longer length and a second group of OFDM symbols in a second sTTI having a shorter length, a larger number of subcarriers may be configured for UE-RS transmission in the first group of OFDM symbols than the second group of OFDM symbols.

In one example, the at least two groups of OFDM symbols may be in one and the same slot.

In one example, the at least two groups of OFDM symbols may be in different slots.

In one example, different numbers of subcarriers may be configured for UE-RS transmission in the at least two groups of OFDM symbols.

In one example, the at least two groups of OFDM symbols may be configured in different subframes.

According to a third aspect of the present disclosure, there may be provided a base station comprising: a processor; and a memory having stored thereon a computer program which, when executed on the processor, causes the processor to carry out the method according to the first aspect of the present disclosure and/or any of above examples derived from the first aspect of the present disclosure.

According to a fourth aspect of the present disclosure, there may be provided a user equipment comprising: a processor; and a memory having stored thereon a computer program which, when executed on the processor, causes the processor to carry out the method according to the second aspect of the present disclosure and/or any of above examples derived from the second aspect of the present disclosure.

According to a fifth aspect of the present disclosure, there may be provided a computer-readable storage medium, having stored thereon a computer program which, when executed on at least one processor, causes the at least one processor to carry out the method according to any of the first and second aspect of the present disclosure and/or any of above examples derived from the first and second aspect of the present disclosure.

The proposed schemes may achieve a better tradeoff between channel estimation effectiveness and overheads.

The present disclosure provides the beneficial trade-off between the channel estimation accuracy against the overheads incurred by DMRS.

By varying the DMRS subcarrier index between different symbols carrying DMRS, better handling of time and frequency variations can be achieved (more robust against delay and/or Doppler spread), while limiting the DMRS overhead.

BRIEF DESCRIPTION OF THE DRAWINGS

The above and other objects, features, and advantages of the present disclosure will become apparent from the following descriptions on embodiments of the present disclosure with reference to the drawings, in which.

Figure 1A:
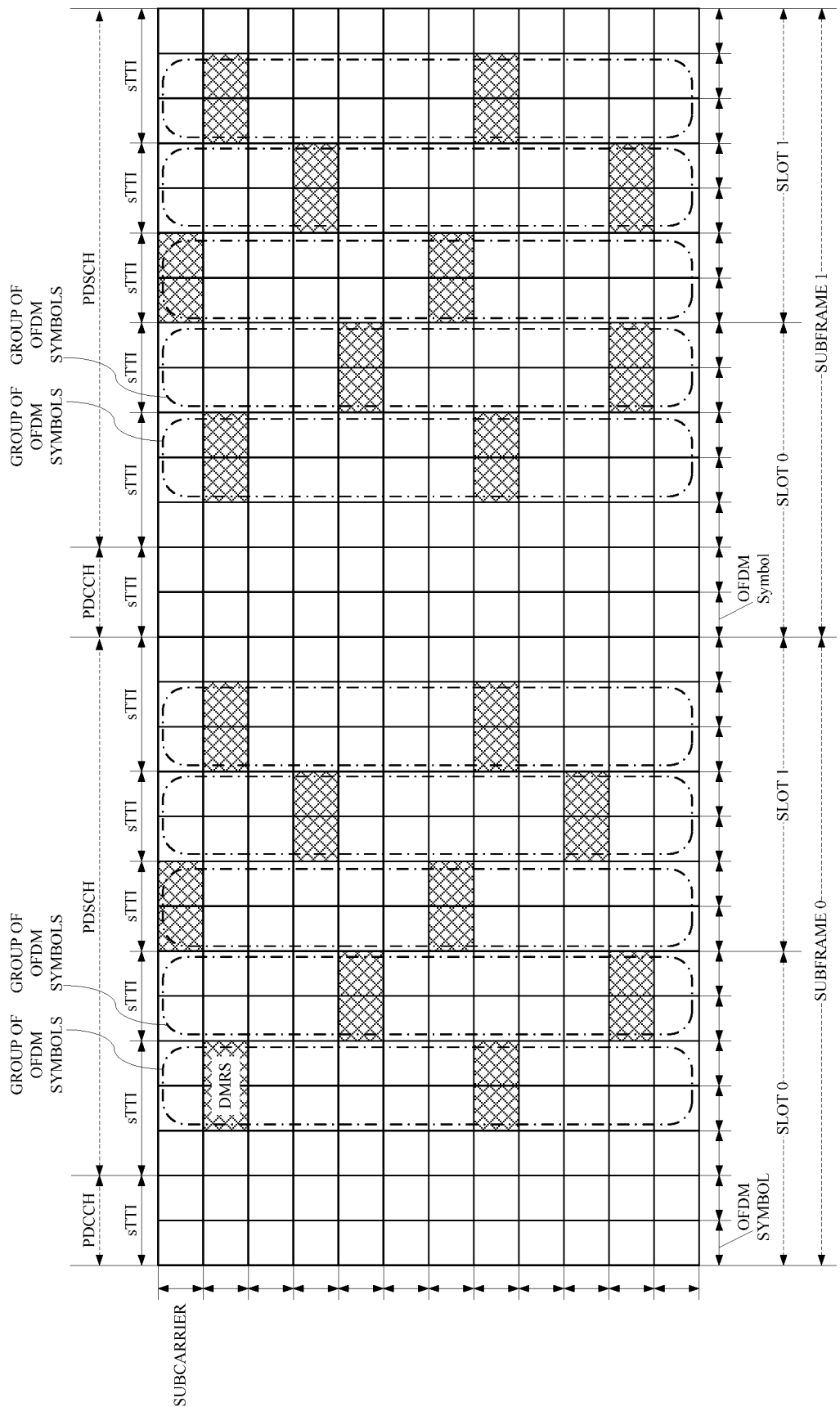
FIG. 1A shows a schematic diagram of an embodiment where DMRS Resource Elements (REs) shifting in subcarriers is applied in an inter-sTTI scenario.

In the drawings, similar or same steps and/or elements are designated with similar or same referential numbers. It is to be noted that not all the steps and/or elements shown in the drawings are necessary for some embodiments of the present disclosure.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

References in the specification to "one embodiment," "an embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "base station", "user equipment", "access point" and "network node" as used herein should be understood in a broad sense. Specifically, the base station should be understood to encompass a legacy base station in a $2^{nd}$ Generation (2G) network, a NodeB in a $3^{rd}$ Generation (3G) network, an evolved NodeB (eNode B) in a 4th Generation (4G), a gNB in a 5th Generation (5G) or NR network or future evolved network (e.g., LTE network, LTE-A network etc.), and the like. The user equipment should be understood to encompass a mobile telephone, a smartphone, a wireless-enabled tablet or personal computer, a wireless machine-to-machine unit, and the like.

According to a first aspect of the present disclosure, a base station (BS) may configure User Equipment (UE)-specific Reference Signal (UE-RS) in two or more groups of Orthogonal Frequency Division Multiplexing (OFDM) symbols on a short Physical Downlink Sharing CHannel (sPDSCH), so that subcarrier indices used for UE-RS transmission are different between at least two groups of OFDM symbols (OSs). Then, the base station may transmit the UE-RS to a user equipment. Herein, a group of OFDM symbols may consist of two or three or more OFDM symbols only if the group of OFDM symbols may carry UE-RS therein, and the present disclosure is not limited thereto.

According to a second aspect of the present disclosure, a user equipment (UE) may receive UE-RS from a base station, where the UE-RS are configured in two or more groups of OFDM symbols on an sPDSCH, and subcarrier indices used for UE-RS transmission are different between at least two groups of OFDM symbols. Then, the user equipment may perform channel estimation based on the received UE-RS. Also, herein, a group of OFDM symbols may consist of two or three or more OFDM symbols only if the group of OFDM symbols may carry UE-RS therein, and the present disclosure is not limited thereto.

UE-RS may be also called as DeModulation Reference Signal (DMRS) in context of LTE. Therefore, the terms "UE-RS" and "DMRS" can be interchangeably used in the present disclosure.

In RAN1 #89 the following agreement was made for DMRS pattern for short TTI.

The Downlink (DL) DMRS pattern is fixed for 2-layer 2/3-symbol short Physical Downlink Sharing CHannel (sPDSCH).

Down-selected between option 1, 2, 3 (X=2N+1 or X=2N, where N is the number of Resource Blocks (RBs)).

DL DMRS can be shared among 2 consecutive sTTIs for the same UE for 2/3-symbol sPDSCH.

Sharing across subframes is not supported

For Further Study (FFS): Sharing across slots

FFS: 3 consecutive sTTIs

DL DMRS Resource Element (RE) shift in frequency domain is supported when colliding with Cell-specific Reference Signal (CRS) RE.

In the present disclosure, description is based on a DMRS design similar to regular 1 ms TTI, where the DMRS is placed as a RE-pair where the two REs carry DMRS for two antenna ports (overlapping but separated by an orthogonal cover code, hereafter referred to as "port" or "ports"). However, one DMRS may occupy 2 Resource Elements (REs), 3 REs, 4 REs, or even more REs according to specific system implementations. For purpose of illustration, one DMRS is shown to occupy 2 REs in the drawings but the present disclosure is not limited thereto. Additionally, in the present disclosure, UE-RS (DMRS) can be configured as corresponding to a set of antenna ports (for example, two antenna ports, three antenna ports, or any suitable number of antenna ports).

Additionally, it should be noted that although the embodiments are provided in the context of physical resource arrangements in LTE, the same mechanism may be also adopted in NR.

Hereunder, the embodiments of the present disclosure will be described in details in conjunction with the drawings. It is to be noted that in the drawings, a group of OFDM symbols is shown as consisting of two OFDM symbols, but as mentioned before, a group of OFDM symbols may consist of three OFDM symbols, four OFDM symbols, or any suitable number of OFDM symbols only if the group of OFDM symbols may carry DMRS therein.

Figure 9A:
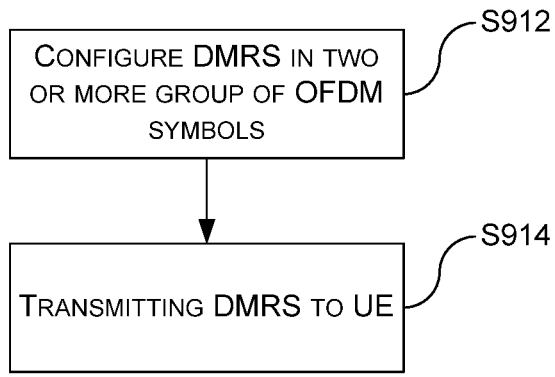
FIG. 9A shows a flow chart 910 of a BS for implementing at least some of the embodiments according to the present disclosure.

FIG. 9A shows a flow chart 910 of a BS for implementing at least some of the embodiments according to the present disclosure.

In FIG. 9A, the method 910 includes a step S912 of configuring DMRS in two or more groups of OFDM symbols on a short Physical Downlink Sharing CHannel (sPDSCH). Herein, the DMRS may be configured according to any one of the embodiments shown in FIGS. 1A-6 (which will be detailed later) or any combination thereof if not conflicting with each other, so that subcarrier indices used for DMRS transmission are different between at least two groups of OFDM symbols in frequency domain. Thereafter, the method 910 includes a step of S914 of transmitting the DMRS to a UE on the sPDSCH channel.

Figure 9B:
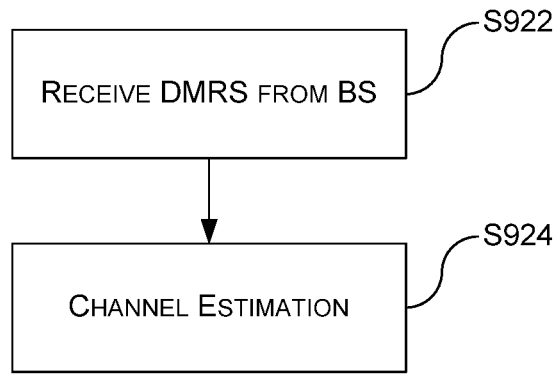
FIG. 9B shows a flow chart 920 of a UE for implementing at least some of the embodiments according to the present disclosure.

FIG. 9B shows a flow chart 920 of a UE for implementing at least some of the embodiments according to the present disclosure.

In FIG. 9B, the method 920 includes a step S922 of receive DMRS from a BS on a sPDSCH channel. Herein, the DMRS may be configured in two or more groups of OFDM symbols according to any one of the embodiments shown in FIGS. 1A-6 (which will be detailed later) or any combination thereof if not conflicting with each other, so that subcarrier indices used for DMRS transmission are different between at least two groups of OFDM symbols. Thereafter, the method 920 includes a step S922 of performing channel estimation based on the received DMRS.

FIG. 1A shows a schematic diagram of an embodiment where DMRS REs shifting in subcarriers is applied in an inter-sTTI scenario. In FIG. 1A, an example of two ports is shown. In which, DMRS occupies one pair of REs.

In FIG. 1A, two subframes, Subframe 0 and Subframe 1, are shown in time domain. However, for those subsequent subframes, they can be similarly configured as Subframe 0 and/or Subframe 1. Each of Subframe 0 and Subframe 1 may consist of two slots, Slot 0 and Slot 1. Each of Slot 0 and Slot 1 may consist of 7 OFDM symbols (OSs) in time domain. In frequency domain, each OFDM symbol may include 12 subcarriers which can be sequentially indexed. In FIG. 1A, one short TTI (sTTI) includes 2 or 3 OFDM symbols, and one slot consists of 3 sTTIs. In view of channel aspect, Physical Downlink Control CHannel (PDCCH) is located in the 1st sTTI of Slot 0 of respective subframe, and the Physical Downlink Sharing CHannel (PDSCH) includes at least the remaining $2^{nd}$-$6^{th}$ sTTIs. Also, as shown in FIG. 1A, two OFDM symbols are grouped into one group of OFDM symbols, and therefore one slot may include 2 or 3 groups of OFDM symbols. For example, Slot 0 includes 2 groups of OFDM symbols and Slot 1 includes 3 groups of OFDM symbols. Additionally, one DMRS occupies 2 REs. The same descriptions about the Subframes, Slots, sTTIs, PDCCH, PDSCH, Groups of OSs may be also applied to FIG. 1B and FIG. 2, and therefore they will not be repeated for simplicity and conciseness when describing FIG. 1B and FIG. 2.

According to FIG. 1A, DMRS REs' locations (subcarrier indices) are changed according to sTTIs so that the DMRS pattern can be distributed as much as possible to spread over the time and frequency domains. That is, subcarrier indices used for DMRS transmission are different between at least two groups of OFDM symbols in frequency domain, and the at least two groups of OFDM symbols can be configured in different sTTIs in time domain. Subcarrier indices used for DMRS transmission in two groups of OSs are different even if there is only one subcarrier index is different between the two groups of OSs, i.e., the subcarrier indices can be fully different or partially different from one another.

In one example, same number of DMRS REs (subcarriers) is used for different types of sTTIs. For example, 2 pairs of DMRS REs (2 subcarriers) are used for both 2 OS sTTI and 3 OS sTTI, as shown in FIG. 1A.

In a further example, the subcarriers used for DMRS transmission in each group of OSs can be evenly distributed in frequency domain. For example, the subcarrier index's interval is 5 as shown in FIG. 1A.

Figure 1B:
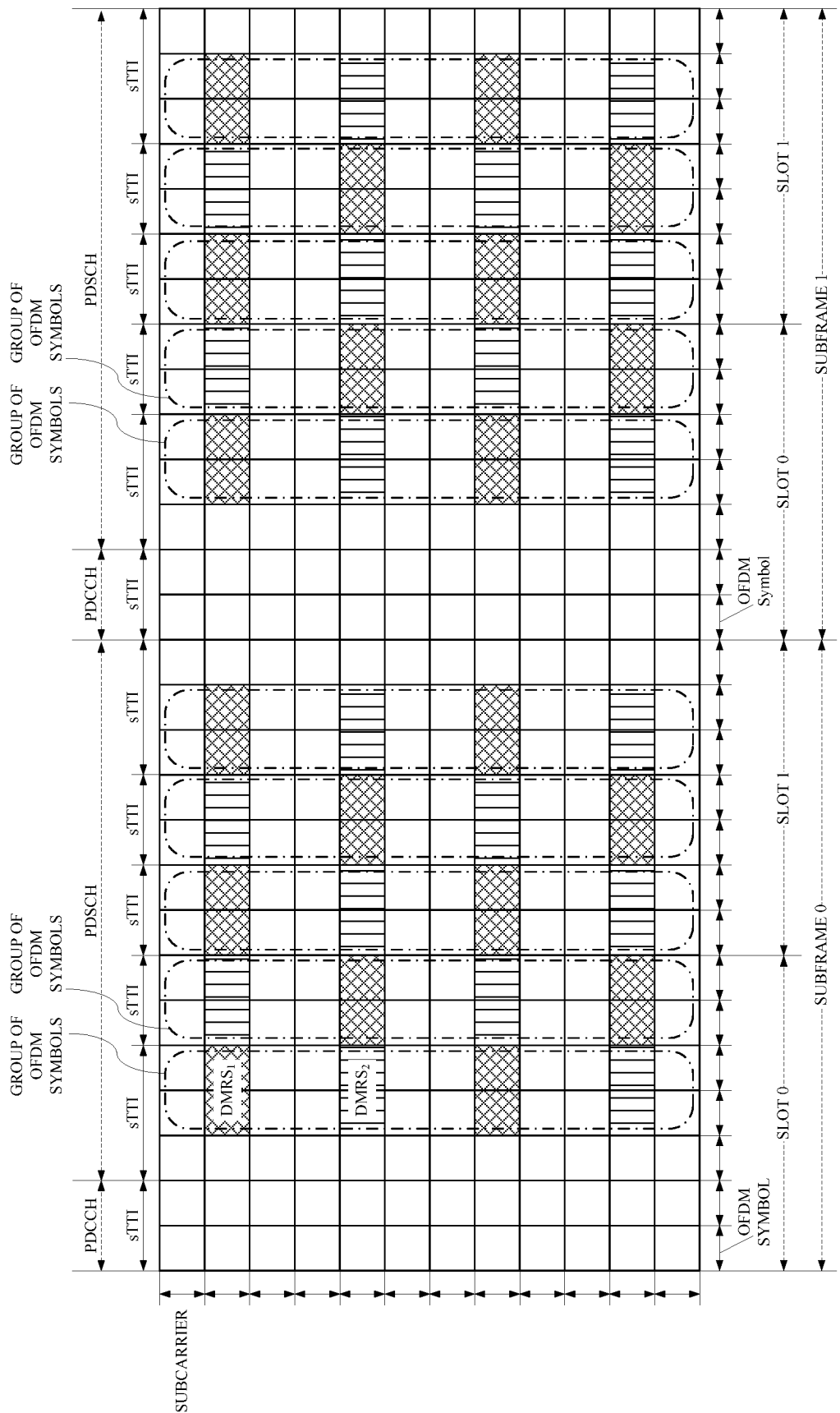
FIG. 1B shows a schematic diagram of another embodiment where DMRS REs shifting in subcarriers is applied in an inter-sTTI scenario.

FIG. 1B shows a schematic diagram of another embodiment where DMRS REs shifting in subcarriers is applied in an inter-sTTI scenario. In FIG. 1B, an example of four ports is shown. In which, DMRS occupies two sets of RE pairs, i.e., $DMRS_1$ corresponds to two ports and $DMRS_2$ corresponds to another two ports, in FIG. 1B, $DMRS_1$ and $DMRS_2$ are shown with different hatchings. Similarly, considering $DMRS_1$ or $DMRS_2$, the same rules as FIG. 1A can be applied, i.e., $DMRS_1$ ore REs' locations (subcarrier indices) are changed according to sTTIs so that the $DMRS_{1\ or\ 2}$ pattern can be distributed as much as possible to spread over the time and frequency domains. That is, subcarrier indices used for $DMRS_1$ ore transmission are different between at least two groups of OSs in frequency domain, and the at least two groups of OSs can be configured in different sTTIs in time domain.

Figure 2:
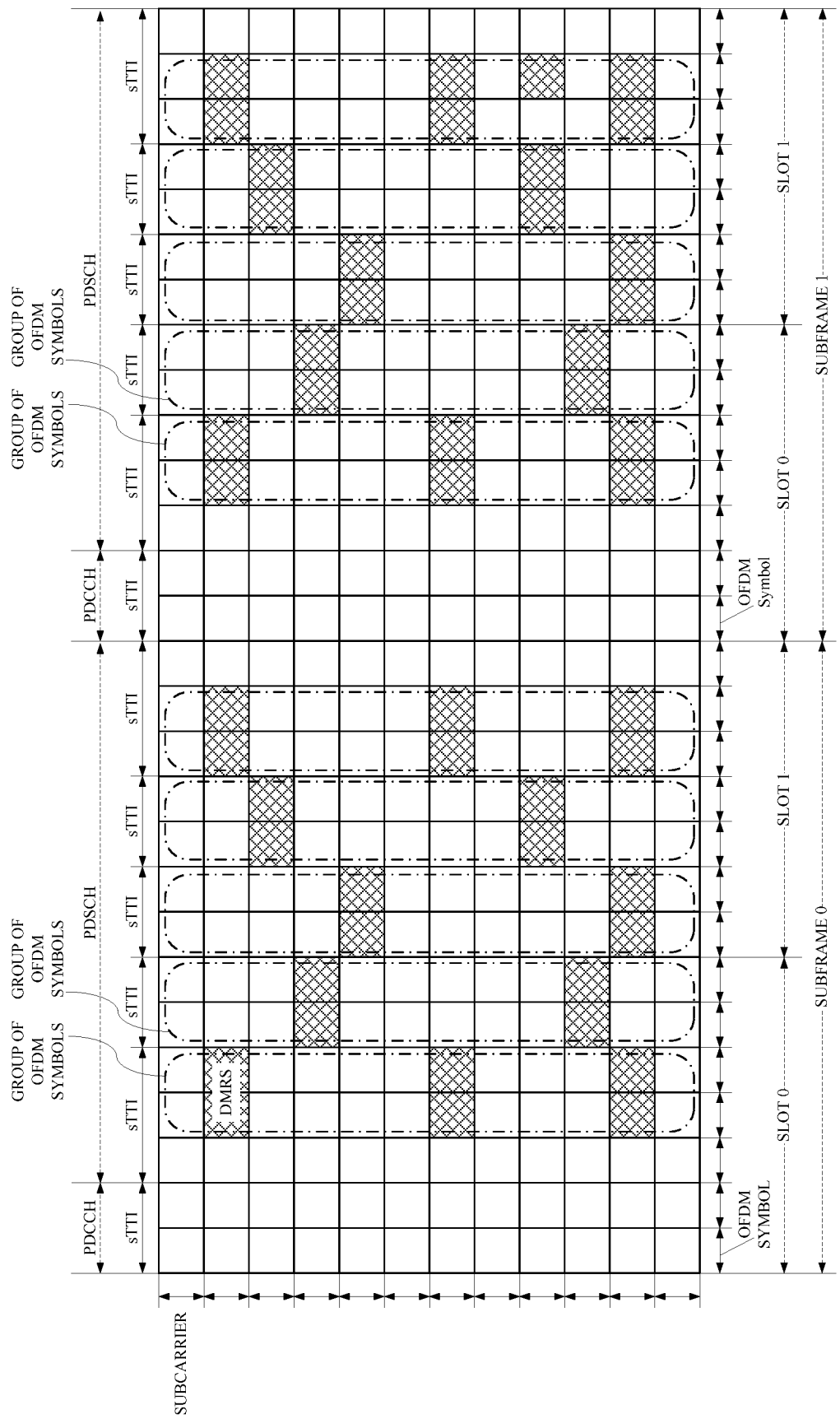
FIG. 2 shows a schematic diagram of an embodiment where different numbers of DMRS REs are applied according to different lengths of sTTIs.

FIG. 2 shows a schematic diagram of an embodiment where different numbers of DMRS REs are applied according to different lengths of sTTIs.

Different from FIG. 1A, in another example, the number of subcarriers used for DMRS transmission in each group of OSs in frequency domain is dependent on a length of an sTTI to which the group of OSs belongs.

For example, for a first group of OSs in a first sTTI having a longer length in time domain and a second group of OSs in a second sTTI having a shorter length in time domain, a larger number of subcarriers can be configured for DMRS transmission in the first group of OSs than the second group of OSs in frequency domain.

In conjunction with FIG. 2, a comparison can be made between the first two groups of OSs from the left. The first group of OSs belongs to a 3 OS sTTI and the second group OSs belongs to a 2 OS sTTI. Accordingly, there are 3 pairs of DMRS REs (3 subcarriers) configured in the first group of OSs and 2 pairs of DMRS REs (2 subcarriers) configured in the second group of OSs.

Figure 3A:
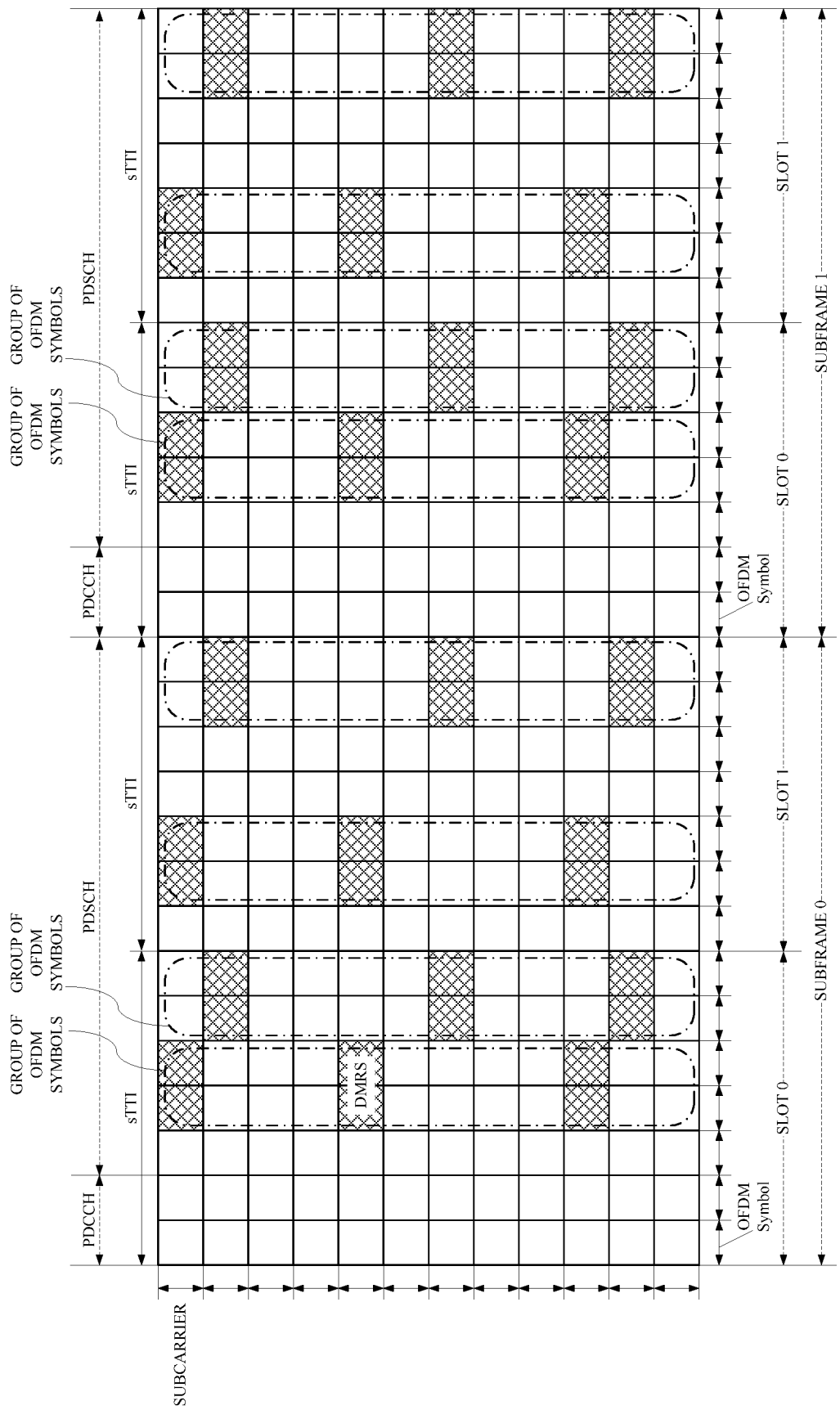
FIG. 3A shows a schematic diagram of an embodiment where DMRS REs shifting in subcarriers is applied in an intra-slot scenario.

FIG. 3A shows a schematic diagram of an embodiment where DMRS REs shifting in subcarriers is applied in an intra-slot scenario. In FIG. 3A, an example of two ports is shown. In which, DMRS occupies one pair of REs.

In FIG. 3A, two subframes, Subframe 0 and Subframe 1, are shown in time domain. However, for those subsequent subframes, they can be similarly configured as Subframe 0 and/or Subframe 1. Each of Subframe 0 and Subframe 1 may consist of two slots, Slot 0 and Slot 1. Each of Slot 0 and Slot 1 may consist of 7 OFDM symbols (OSs) in time domain. In frequency domain, each OFDM symbol may include 12 subcarriers which can be sequentially indexed. In FIG. 3A, one short TTI (sTTI) includes 7 OFDM symbols, i.e., one slot consists of one sTTI. In view of channel aspect, Physical Downlink Control CHannel (PDCCH) is located at the beginning of the 1st sTTI (Slot 0) of respective subframe, and the Physical Downlink Sharing CHannel (PDSCH) follows PDCCH and includes major part of Slot 0 and the whole Slot 1. Also, as shown in FIG. 3A, two OFDM symbols are grouped into one group of OFDM symbols, and therefore one slot may include 1 or 2 or 3 groups of OFDM symbols. For example, Slot 0 includes 2 groups of OFDM symbols and Slot 1 also includes 2 groups of OFDM symbols. Additionally, one DMRS occupies 2 REs. The same descriptions about the Subframes, Slots, sTTIs, PDCCH, PDSCH, Groups of OSs may be also applied to FIG. 3B and FIG. 6, and therefore they will not be repeated for simplicity and conciseness when describing FIG. 3B and FIG. 6.

According to FIG. 3A, DMRS REs' locations (subcarrier indices) are changed in one slot. That is, subcarrier indices used for DMRS transmission are different between at least two groups of OFDM symbols in frequency domain, and the at least two groups of OSs can be configured in one and the same slot in time domain. Subcarrier indices used for DMRS transmission in two groups of OSs are different even if there is only one subcarrier index is different between the two groups of OSs, i.e., the subcarrier indices can be fully different or partially different from one another.

In one example, same number of DMRS REs (subcarriers) can be configured in frequency domain in the at least two groups of OSs in one and the same slot. For example, 3 pairs of DMRS REs (3 subcarriers) are used in all the 8 groups of OSs shown in FIG. 3A. Additionally, the subcarrier index's intervals are 4 and 3 interleaved as shown in FIG. 3A.

Figure 3B:
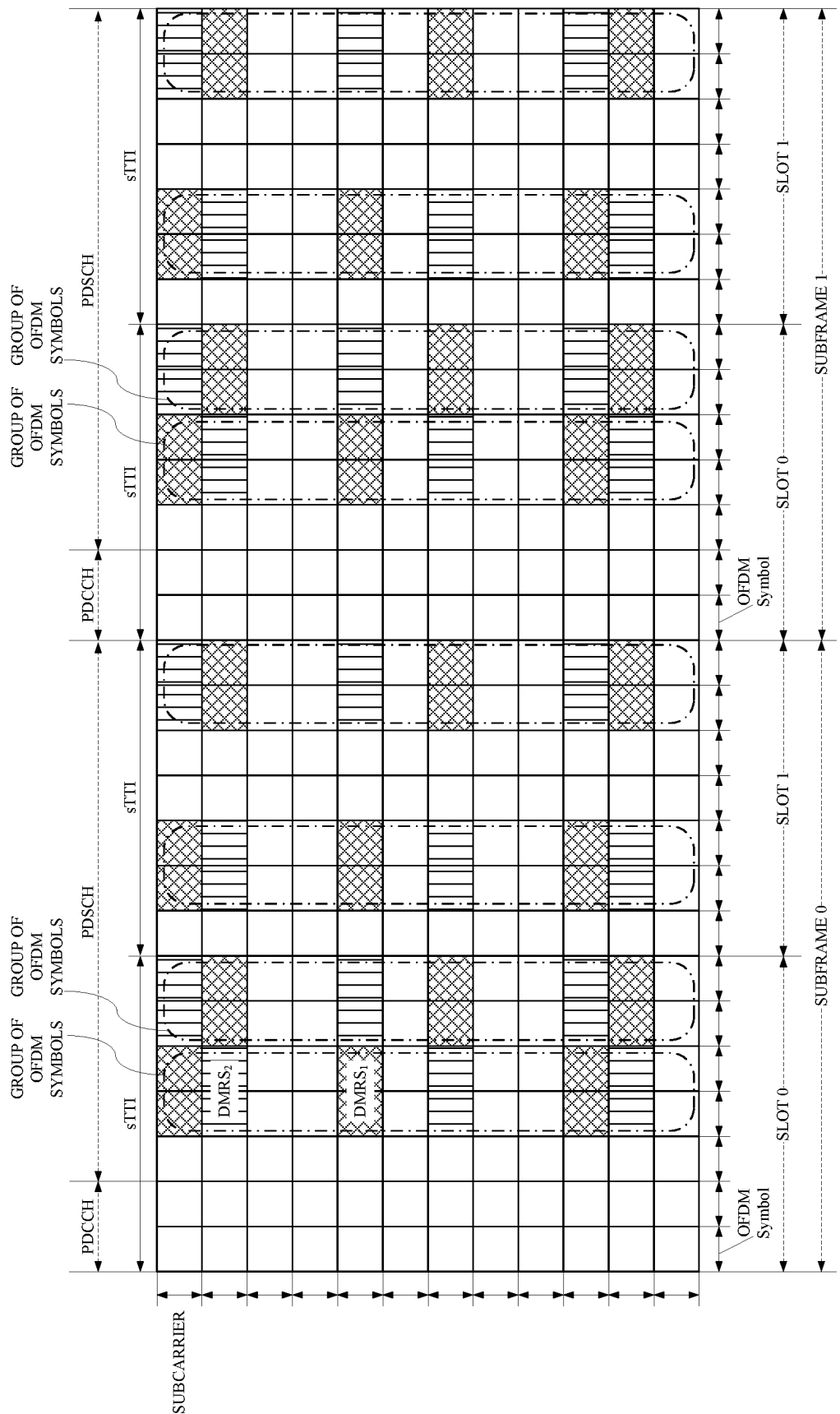
FIG. 3B shows a schematic diagram of another embodiment where DMRS REs shifting in subcarriers is applied in an intra-slot scenario.

FIG. 3B shows a schematic diagram of another embodiment where DMRS REs shifting in subcarriers is applied in an intra-slot scenario. In FIG. 3B, an example of four ports is shown. In which, DMRS occupies two sets of RE pairs, i.e., $DMRS_1$ corresponds to two ports and $DMRS_2$ corresponds to another two ports, in FIG. 3B, $DMRS_1$ and $DMRS_2$ are shown with different hatchings. Similarly, considering $DMRS_1$ or $DMRS_2$, the same rules as FIG. 3A can be applied, i.e., $DMRS_{1\ or\ 2}$ REs' locations (subcarrier indices) are changed in one slot so that the $DMRS_{1\ or\ 2}$ pattern can be distributed as much as possible to spread over the time and frequency domains. That is, subcarrier indices used for $DMRS_{1\ or\ 2}$ transmission are different between at least two groups of OSs in frequency domain, and the at least two groups of OSs can be configured in one and the same slot in time domain.

Figure 4:
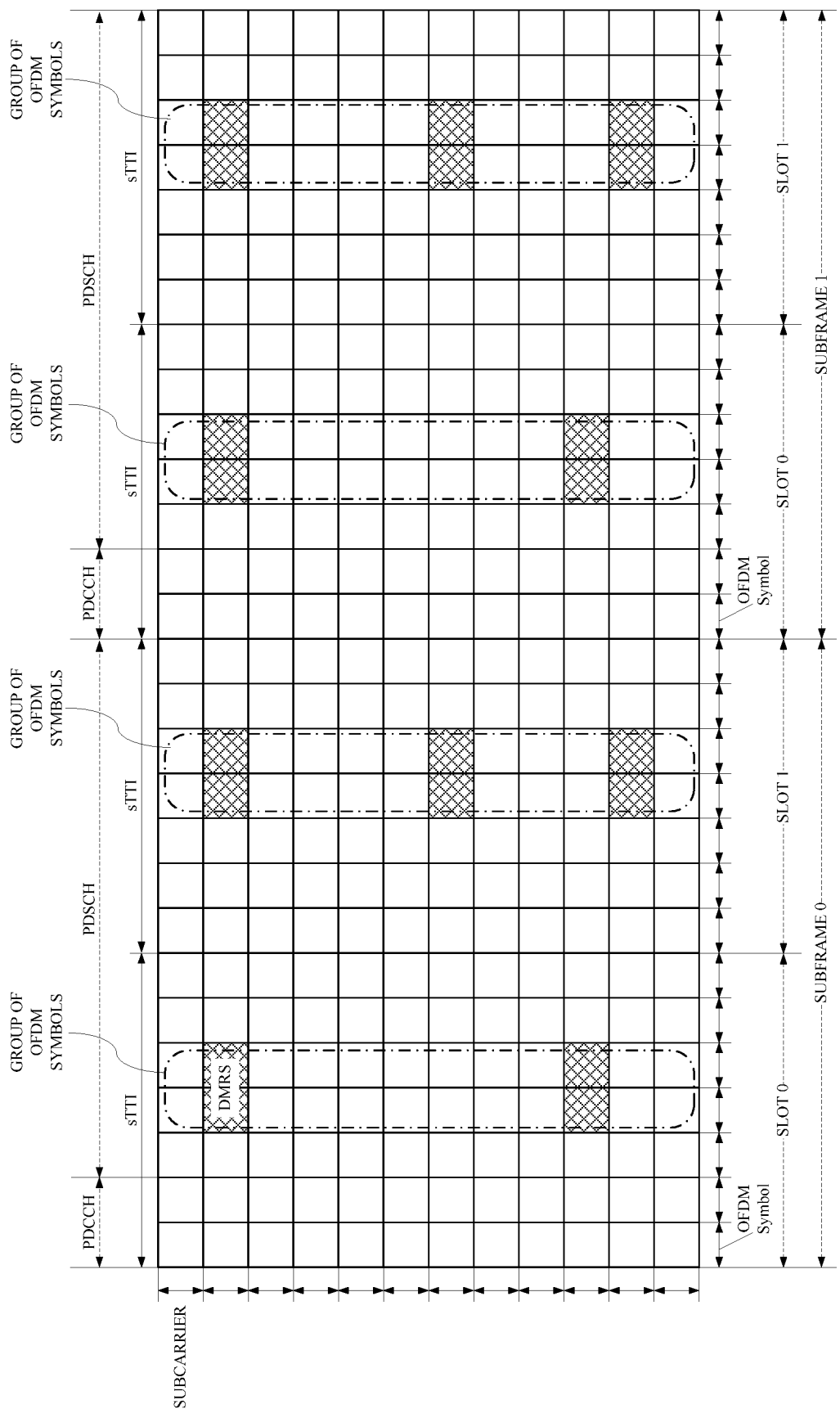
FIG. 4 shows a schematic diagram of an embodiment where different numbers of DMRS REs are applied for different slots.

FIG. 4 shows a schematic diagram of an embodiment where different numbers of DMRS REs are applied for different slots. In FIG. 4, an example of two ports is shown. In which, DMRS occupies one pair of REs.

In FIG. 4, two subframes, Subframe 0 and Subframe 1, are shown in time domain. However, for those subsequent subframes, they can be similarly configured as Subframe 0 and/or Subframe 1. Each of Subframe 0 and Subframe 1 may consist of two slots, Slot 0 and Slot 1. Each of Slot 0 and Slot 1 may consist of 7 OFDM symbols (OSs) in time domain. In frequency domain, each OFDM symbol may include 12 subcarriers which can be sequentially indexed. In FIG. 4, one short TTI (sTTI) includes 7 OFDM symbols, i.e., one slot consists of one sTTI. In view of channel aspect, Physical Downlink Control CHannel (PDCCH) is located at the beginning of the 1st sTTI (Slot 0) of respective subframe, and the Physical Downlink Sharing CHannel (PDSCH) follows PDCCH and includes major part of Slot 0 and the whole Slot 1. Also, as shown in FIG. 4, two OFDM symbols are grouped into one group of OFDM symbols, and therefore one slot may include 1 or 2 or 3 groups of OFDM symbols. For example, Slot 0 includes 1 group of OFDM symbols and Slot 1 also includes 1 group of OFDM symbols. Additionally, one DMRS occupies 2 REs.

According to FIG. 4, DMRS REs' locations (subcarrier indices) are changed according to slots so that the DMRS pattern can be distributed as much as possible to spread over the time and frequency domains. That is, subcarrier indices used for DMRS transmission are different between at least two groups of OFDM symbols in frequency domain, and the at least two groups of OFDM symbols can be configured in different slots in time domain. Subcarrier indices used for DMRS transmission in two groups of OSs are different even if there is only one subcarrier index is different between the two groups of OSs, i.e., the subcarrier indices can be fully different or partially different from one another.

In one example, same number of DMRS REs (subcarriers) can be used for different groups of OSs in different slots (or different sTTIs).

In another example, different numbers of DMRS REs (subcarriers) can be used for DMRS transmission in different groups of OSs in different slots (or different sTTIs). For example, in FIG. 4, there are 2 pairs of DMRS REs (2 subcarriers) configured in a group of OSs in Slot 0 and 3 pairs of DMRS REs (3 subcarriers) configured in a group of OSs in Slot 1.

Figure 5:
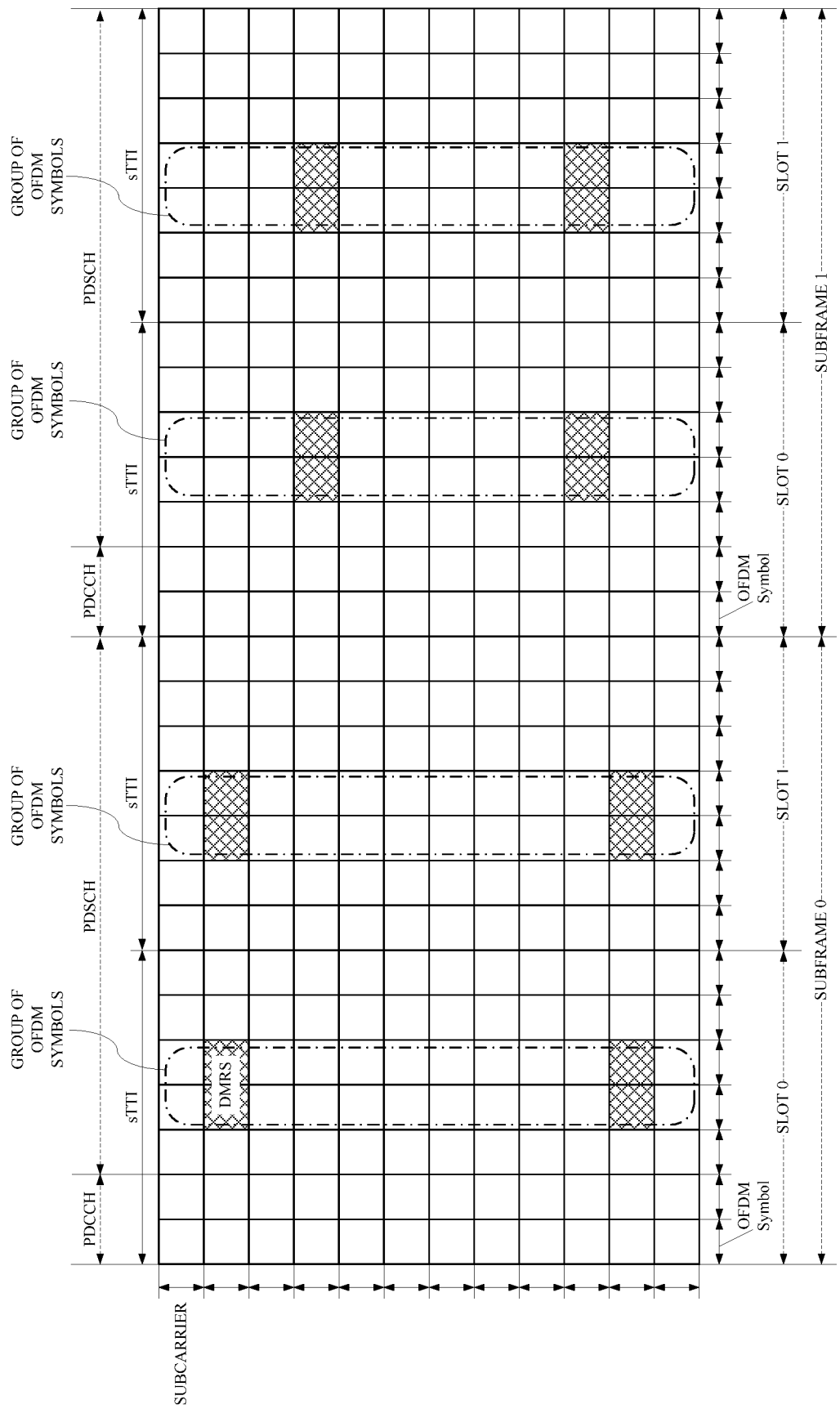
FIG. 5 shows a schematic diagram of an embodiment where DMRS REs shifting in subcarriers is applied in an inter-subframe scenario.

FIG. 5 shows a schematic diagram of an embodiment where DMRS REs shifting in subcarriers is applied in an inter-subframe scenario. In FIG. 5, an example of two ports is shown. In which, DMRS occupies one pair of REs.

In FIG. 5, two subframes, Subframe 0 and Subframe 1, are shown in time domain. However, for those subsequent subframes, they can be similarly configured as Subframe 0 and/or Subframe 1. Each of Subframe 0 and Subframe 1 may consist of two slots, Slot 0 and Slot 1. Each of Slot 0 and Slot 1 may consist of 7 OFDM symbols (OSs) in time domain. In frequency domain, each OFDM symbol may include 12 subcarriers which can be sequentially indexed. In FIG. 5, one short TTI (sTTI) includes 7 OFDM symbols, i.e., one slot consists of one sTTI. In view of channel aspect, Physical Downlink Control CHannel (PDCCH) is located at the beginning of the 1st sTTI (Slot 0) of respective subframe, and the Physical Downlink Sharing CHannel (PDSCH) follows PDCCH and includes major part of Slot 0 and the whole Slot 1. Also, as shown in FIG. 5, two OFDM symbols are grouped into one group of OFDM symbols, and therefore one slot may include 1 or 2 or 3 groups of OFDM symbols. For example, Slot 0 includes 1 group of OFDM symbols and Slot 1 also includes 1 group of OFDM symbols. Additionally, one DMRS occupies 2 REs.

According to FIG. 5, DMRS REs' locations (subcarrier indices) are changed according to subframes so that the DMRS pattern can be distributed as much as possible to spread over the time and frequency domains. That is, subcarrier indices used for DMRS transmission are different between at least two groups of OFDM symbols in frequency domain, and the at least two groups of OFDM symbols can be configured in different subframes in time domain. Subcarrier indices used for DMRS transmission in two groups of OSs are different even if there is only one subcarrier index is different between the two groups of OSs, i.e., the subcarrier indices can be fully different or partially different from one another. In one example, same number of DMRS REs (subcarriers) can be used for different groups of OSs in different subframes. For example, in FIG. 5, there are 2 pairs of DMRS REs (2 subcarriers) respectively configured in respective groups of OSs in Slot 0 and Slot 1 in Subframe 0, and also, there are 2 pairs of DMRS REs (2 subcarriers) respectively configured in respective groups of OSs in Slot 0 and Slot 1 in Subframe 1.

In another example, different numbers of DMRS REs (subcarriers) can be used for DMRS transmission in different groups of OSs in different subframes.

Figure 6:
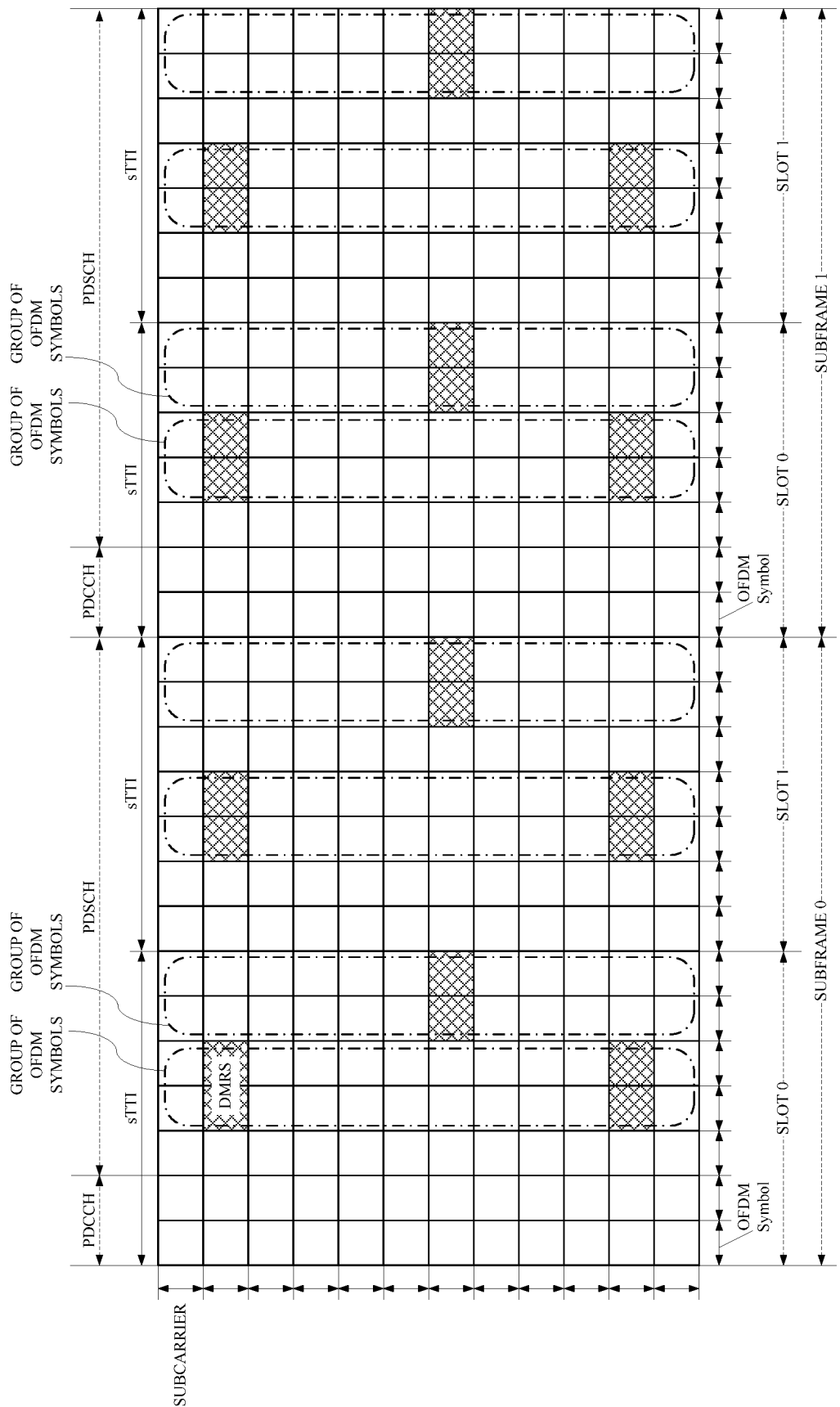
FIG. 6 shows a schematic diagram of an embodiment where DMRS REs shifting in subcarriers and different numbers of DMRS REs are applied in an intra-slot scenario.
Figure 7A:
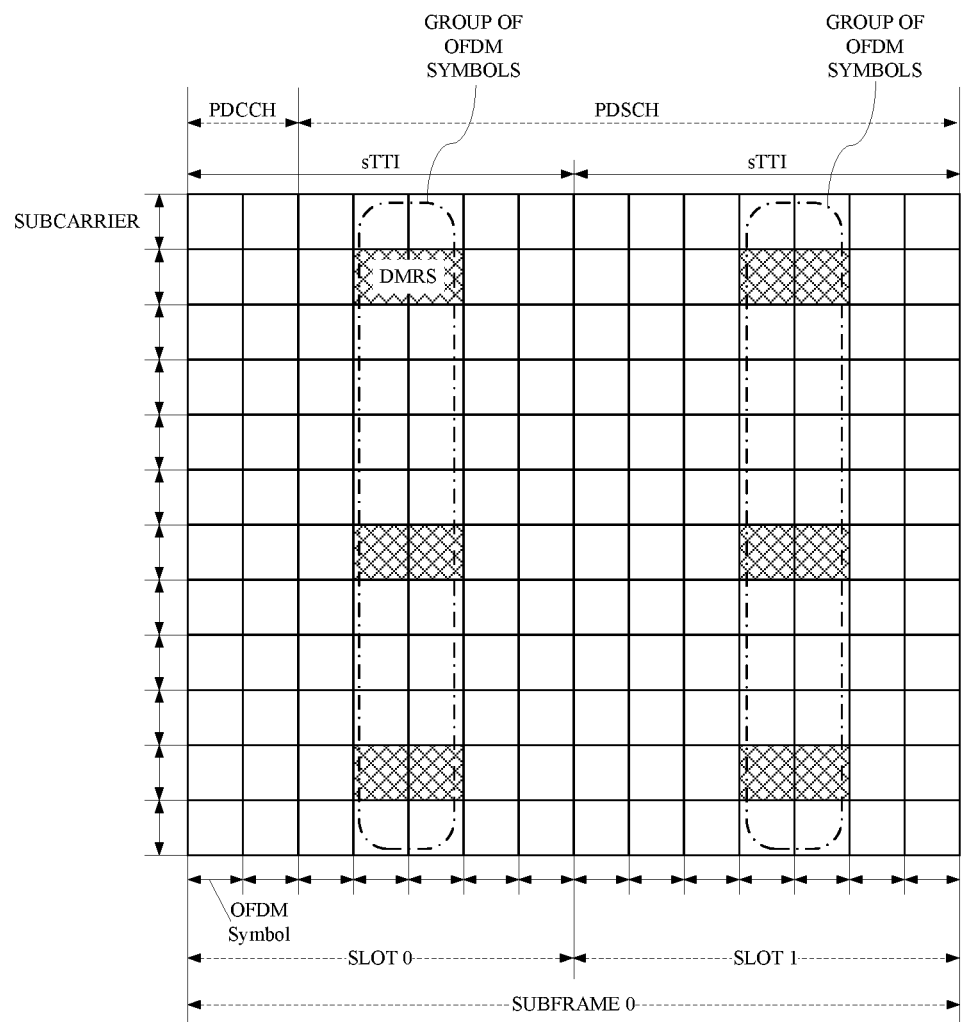
FIGS. 7A-7D shows schematic diagrams of comparable examples where DMRS REs are not shifted in subcarriers.
Figure 7B:
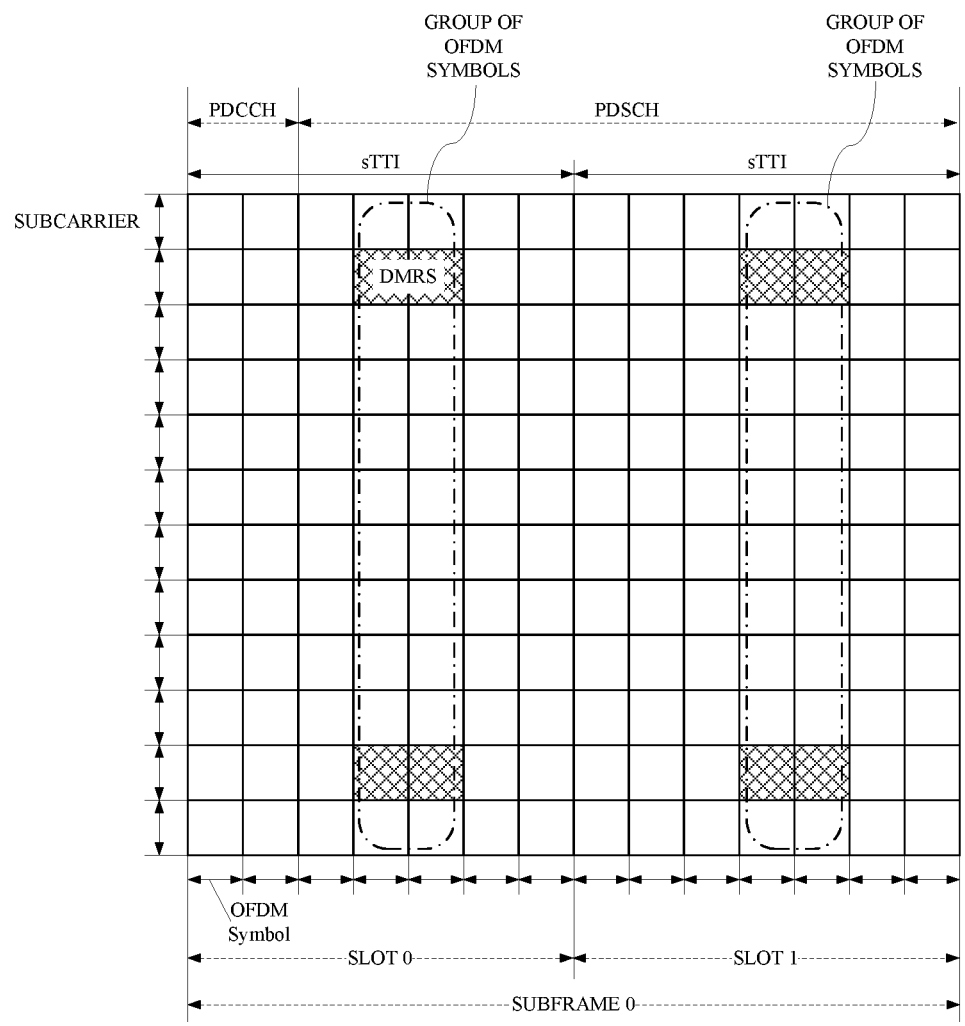
Figure 7C:
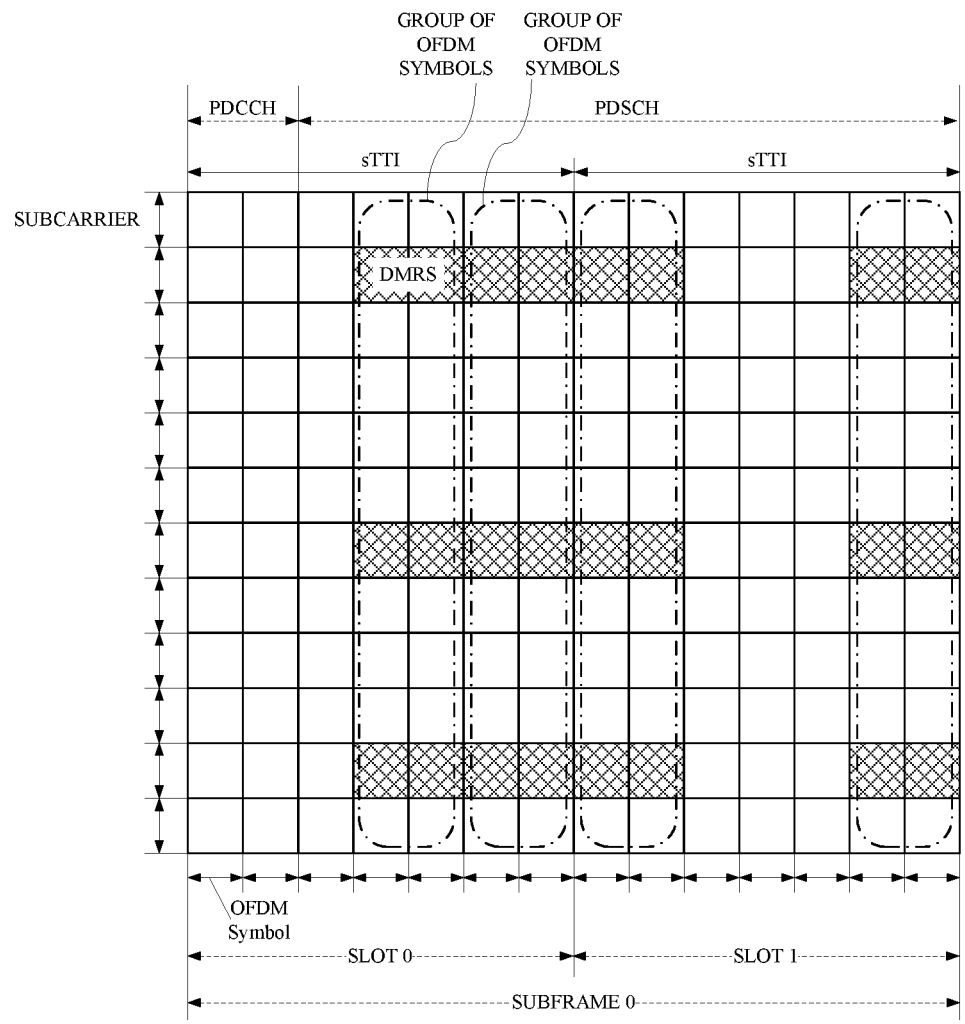
Figure 7D:
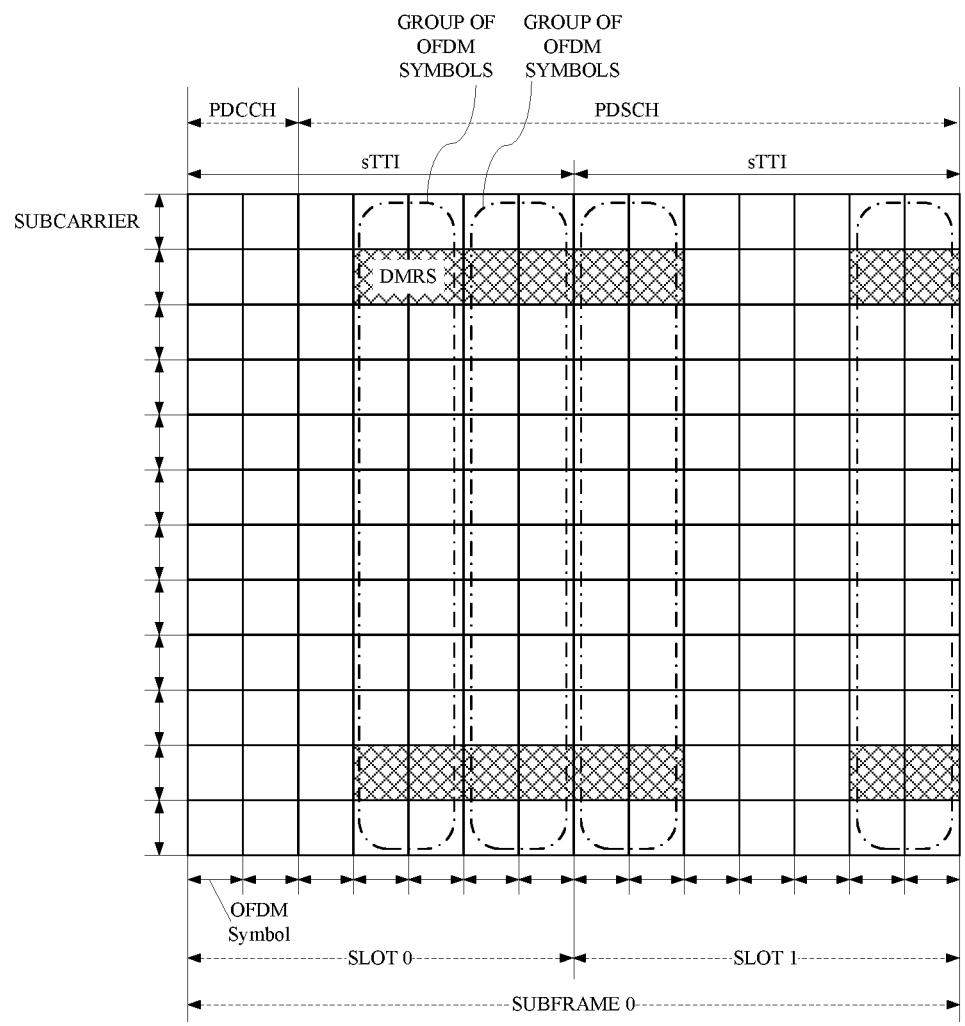

FIG. 6 shows a schematic diagram of an embodiment where DMRS REs shifting in subcarriers and different numbers of DMRS REs are applied in an intra-slot scenario.

Different from FIG. 3A, in another example, different numbers of DMRS REs (subcarriers) can be configured in frequency domain for DMRS transmission in the at least two groups of OFDM symbols in one and the same slot. For example, in FIG. 6, there are 2 pairs of DMRS REs (2 subcarriers) configured in the left group of OSs in Slot 0 but 1 pair of DMRS REs (1 subcarrier) configured in the right group of OSs in Slot 0; and similarly, there are 2 pairs of DMRS REs (2 subcarriers) configured in the left group of OSs in Slot 1 but 1 pair of DMRS REs (1 subcarrier) configured in the right group of OSs in Slot 1.

FIGS. 7A-7D shows schematic diagrams of comparable examples where DMRS REs are not shifted in subcarriers. The same descriptions about the Subframes, Slots, sTTIs, PDCCH, PDSCH, Groups of OSs may be referenced to FIG. 3A or FIG. 6, and therefore they will not be repeated for simplicity and conciseness. In FIGS. 7A-7D, the DMRS REs are not shifted in subcarriers and the number of DMRS REs is also not changed in frequency and time domain.

Figure 8A:
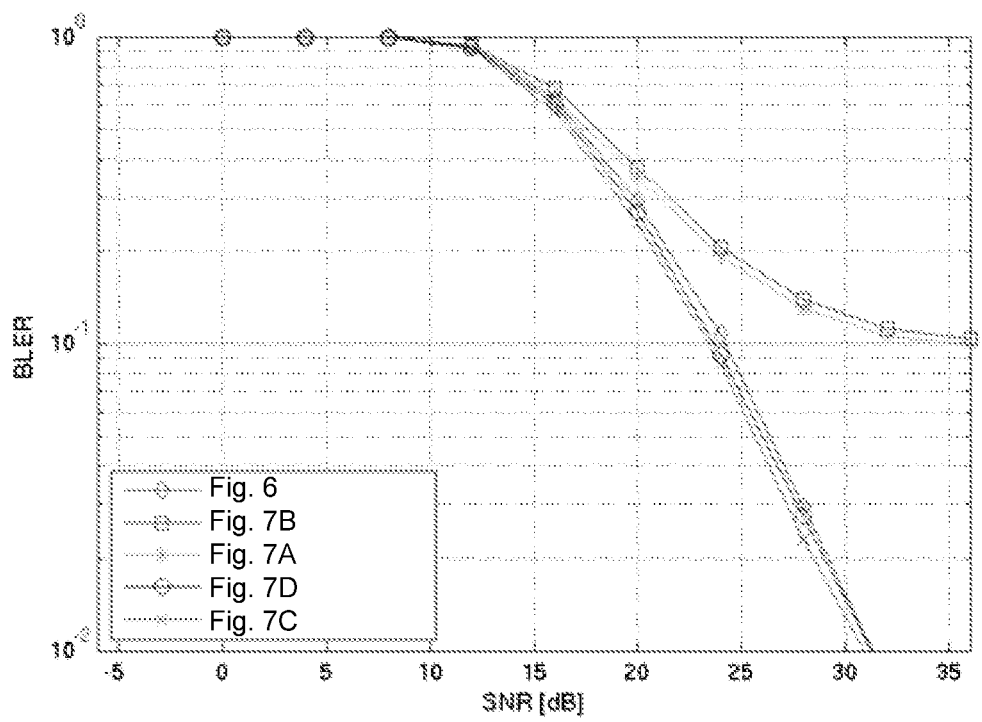
FIG. 8A shows a BLock Error Rate (BLER) comparison between the embodiment of FIG. 6 and the comparable examples of FIGS. 7A-7D.
Figure 8B:
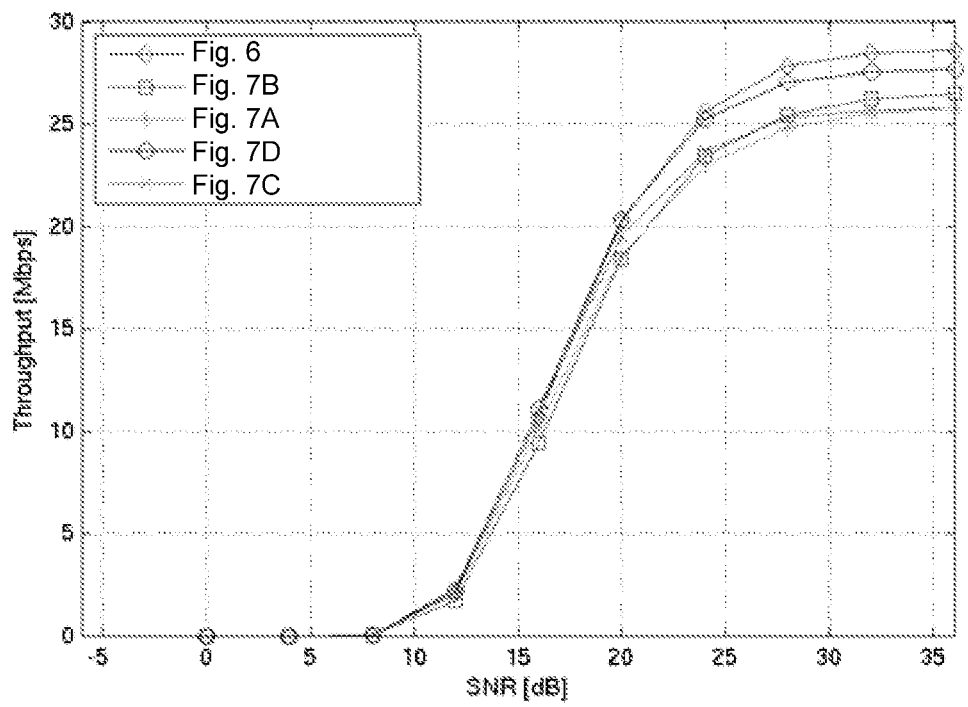
FIG. 8B shows a throughput comparison between the embodiment of FIG. 6 and the comparable examples of FIGS. 7A-7D.

FIG. 8A shows a BLock Error Rate (BLER) comparison between the embodiment of FIG. 6 and the comparable examples of FIGS. 7A-7D; and FIG. 8B shows a throughput comparison between the embodiment of FIG. 6 and the comparable examples of FIGS. 7A-7D.

The above pattern of FIG. 6 has low DMRS overhead and performs well in high-Doppler channel. The solution of FIG. 6 can be compared with those in FIGS. 7A-7D and it can be seen that the solution of FIG. 6 may achieve gains in BLER (FIG. 8A) and throughput (FIG. 8B).

Applying the pattern of FIG. 6 in a high-Doppler, low-delay-spread environment, the pattern can capture fast variations of the channel when the channel is fairly frequency flat. Here, it is provided the high-Doppler benefits of FIGS. 7C and 7D with low overhead but only for low delay spread.

Applying the pattern of FIG. 6 in a high-delay-spread and low-Doppler environment, the pattern can capture the fast variations of the channel frequency response when the channel only changes slowly over time. Here, it is provided the high-delay-spread benefits of FIGS. 7A and 7B with low overhead but only for low Doppler.

FIGS. 8A and 8B show the simulation results of rank-2 downlink transmission using the DMRS patterns discussed in this section in 60 km/h EPA channel model. FIGS. 8A and 8B show BLER and throughput of the link-level performance and illustrates the benefit of using the DMRS pattern of FIG. 6 compared to other DMRS patterns of FIGS. 7A-7D.

Figure 10:
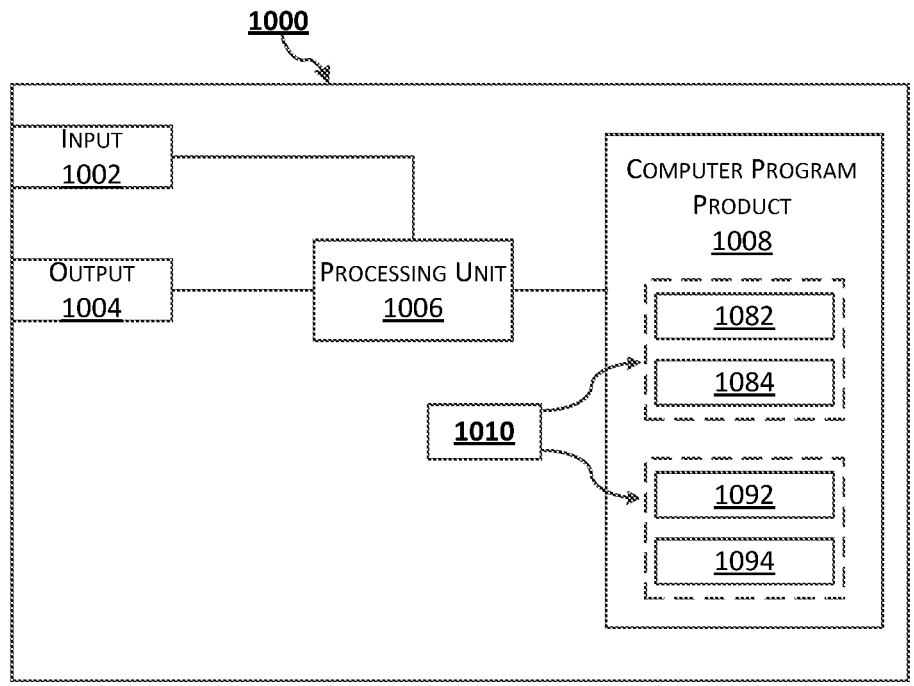
FIG. 10 schematically shows an embodiment of an apparatus 1000 which may be used as a BS or a UE.

FIG. 10 schematically shows an embodiment of an apparatus 1000 which may be used as a BS or a UE.

Comprised in the apparatus 1000 are here a processing unit 1006, e.g., with a Digital Signal Processor (DSP). The processing unit 1006 may be a single unit or a plurality of units to perform different actions of procedures described herein. The apparatus 1000 may also comprise an input unit 1002 for receiving signals from other entities, and an output unit 1004 for providing signal(s) to other entities. The input unit and the output unit may be arranged as an integrated entity or as illustrated in the example of FIG. 10.

Furthermore, the apparatus 1000 comprises at least one computer program product 1008 in the form of a non-volatile or volatile memory, e.g., an Electrically Erasable Programmable Read-Only Memory (EEPROM), a flash memory and a hard drive. The computer program product 1008 comprises a computer program 1010, which comprises code/computer readable instructions, which when executed by the processing unit 1006 in the apparatus 1000 causes the apparatus 1000 in which it is comprised to perform the actions, e.g., of the procedure described earlier for either UE or for BS in conjunction with FIG. 9A or FIG. 9B.

In an embodiment, the computer program 1010 may be configured as a computer program code structured in computer program modules 1082-1084 corresponding to the actions of S912-S914 for BS respectively or computer program modules 1092-1094 corresponding to the actions of S922-S924 for UE respectively.

For concise and simplicity, the relevant actions of the processing unit 1006 caused by the computer program modules 1082-1084 or 1092-1094 are exactly corresponding to those performed by BS or UE so that apparatus 1000 can be used as the BS or the UE described in the present disclosure.

Although the code means in the embodiments disclosed above in conjunction with FIG. 10 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

In an embodiment of the present disclosure, there is provided a computer-readable storage medium (e.g., computer program product 1008) storing instructions that when executed, cause one or more computing devices to perform the methods according to the present disclosure.

SUPPLEMENTAL NOTES

This document presents several features and methods for DL DMRS pattern design at sTTI scenarios. Namely, patterns of DMRS in REs (resource element) over time/slot/frame/symbols and subcarriers are designed with different features regarding their REs relative-positions, to achieve a better tradeoff of channel estimation effectiveness and overheads.

The following description is based on a DMRS design similar to regular 1 ms TTI, where the DMRS is placed as a RE-pair where the two REs carry DMRS for two ports (overlapping but separated by an orthogonal code). CRS ports for port 0 and 1 are placed in symbol 0, 4, 7, 11.

FEATURE 1: inter-sTTI DMRS REs shifting in subcarriers sTTI-specific (shifted in subcarriers) DMRS RE locations are assigned so that the pattern is distributed as much as possible to spread over the time and frequency dimensions.

Same numbers of REs at different type of sTTI (e.g., 2 pairs both for 2 or 3 OS sTTIs).

2 Ports both for 2 or 3 OS sTTIs as illustrated by FIG. 1A.

4 Ports both for 2 or 3 OS sTTIs as illustrated by FIG. 1B. This scheme uses two sets of DMRS pairs ($DMRS_1$ and $DMRS_2$), $DMRS_1$ for the two first port and $DMRS_2$ for the next two ports.

FEATURE 2: different RE numbers at 3 OS sTTI duration or 2 OS ones sTTI-specific numbers of REs at different type of sTTI (e.g., 2 or 3 pairs for 2 or 3 OS sTTIs, respectively), Namely, different REs are used for different sTTI as the sTTI lengths in OFDM symbols are slightly different.

An Example of a case with (2 ports, (2/3 OS sTTIs), 2 OS PDCCH) is illustrated as in FIG. 2.

FEATURE 3: intra-slots DMRS REs shifting in subcarriers (2 ports)

DMRS REs shift on subcarriers for different port-pairs for slot-sTTIs.

An Example of such a case with (2 ports, (slot sTTIs), 2 OS PDCCH) is illustrated in FIG. 3A.

An Example of such a case with (4 ports, (slot sTTIs), 2 OS PDCCH) is illustrated in FIG. 3B.

FEATURE 4: Different DMRS RE numbers for slot-0 and slot-1.

Different DMRS RE-pair numbers for slot0 and slot1 (2 RE-pairs for slot 0 and 3 pairs for slot1) so that the ratio between data and DMRS REs are more even. One example is illustrated in FIG. 4.

FEATURE 5: inter-frame DMRS REs shifting in subcarriers

DMRS REs shift over Slots or subframes, so that with different slots or subframes, the REs of DMRS are at different subcarriers, for cases of multiple sTTI scheduling or other certain cases, these could bring better performances.

One example is illustrated in FIG. 5.

FEATURE 6: DMRS REs in different time and frequency

We also propose the following DMRS pattern for two-layer one-slot TTI communication.

This is a special case of FEATURE 3 (FIG. 3A) above, where each slot have two symbol-pairs carrying DMRS. The first symbol pair has DMRS on two subcarriers, and the second symbol pair has DMRS on an additional subcarrier, different from the two first. The distribution of the REs for DMRS is illustrated in FIG. 6.

The above pattern has low DMRS overhead and performs well in high-Doppler channel. If we compare the above pattern with the following patterns (FIGS. 7A-7D), we may see the gain in throughput and BLER of using the above pattern of FIG. 6.

Applying the pattern in a high-Doppler, low-delay-spread environment, the pattern can capture fast variations of the channel when the channel is fairly frequency flat. (Provides the high-Doppler benefits of FIG. 7C and FIG. 7D, with low overhead but only for low delay spread). FIGS. 7A-7D picture the pattern options.

Applying the pattern in a high-delay-spread and low-Doppler environment, the pattern can capture the fast variations of the channel frequency response when the channel only changes slowly over time. (Provides the high-delay-spread benefits of FIG. 7A and FIG. 7B, with low overhead but only for low Doppler)

The following figures (FIG. 8A and FIG. 8B) show the simulation results of rank-2 downlink transmission using the DMRS patterns discussed in this section in 60 km/h EPA channel model. The FIGS. 8A and 8B show BLER and throughput of the link-level performance and illustrates the benefit of using "Proposed pattern on FEATURE 6" compared to other DMRS patterns.

In a first embodiment, DMRS placement in two or more groups of OFDM symbols, where the subcarrier indices used for DMRS transmission are different between the two groups.

In a second embodiment, based on the first embodiment, where the two groups may be in different short TTIs (FEATURE 1).

In a third embodiment, based on the second embodiment, where the number of used subcarriers in each group may be dependent on the length of the short TTI (FEATURE 2).

In a fourth embodiment, based on the first embodiment, where the two groups may be in the same slot (FEATURE 3).

In a fifth embodiment, based on the first embodiment, where the two groups may be in different slots and the number of used subcarriers are different (FEATURE 4).

In a sixth embodiment, based on the first embodiment, where the two groups may be in different subframes (FEATURE 5).

In a seventh embodiment, based on the fourth embodiment, where the two groups may have different number of subcarriers (FEATURE 6).

Although the present technology has been described above with reference to specific embodiments, it is not intended to be limited to the specific form set forth herein. For example, the embodiments presented herein are not limited to the existing NR/LTE configuration; rather they are equally applicable to new NR/LTE configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method in a base station, comprising:
configuring User Equipment (UE)-specific Reference Signal (UE-RS) corresponding to a set of antenna ports in two or more groups of Orthogonal Frequency Division Multiplexing (OFDM) symbols on a short Physical Downlink Sharing CHannel (sPDSCH), wherein:
indices of subcarriers in frequency domain used for UE-RS transmission are fully different between at least two consecutive groups of OFDM symbols in time domain; and
short Transmission Time Intervals (sTTIs) in the time domain used for UE-RS transmission are different between the at least two consecutive groups of OFDM symbols; and
transmitting the UE-RS to a user equipment.

2. The method of claim 1, wherein a number of the subcarriers used for UE-RS transmission in each group of OFDM symbols is dependent on a length of an sTTI to which the group of OFDM symbols belongs.

3. The method of claim 2, wherein for a first group of OFDM symbols in a first sTTI having a longer length and a second group of OFDM symbols in a second sTTI having a shorter length, a larger number of subcarriers is configured for UE-RS transmission in the first group of OFDM symbols than the second group of OFDM symbols.

4. The method of claim 1, wherein the subcarriers used for UE-RS transmission in each group of OFDM symbols are evenly distributed.

5. The method of claim 1, wherein the at least two consecutive groups of OFDM symbols are in one and a same slot.

6. The method of claim 5, wherein different numbers of subcarriers are configured for UE-RS transmission in the at least two consecutive groups of OFDM symbols.

7. The method of claim 1, wherein the at least two consecutive groups of OFDM symbols are in different slots.

8. The method of claim 1, wherein the at least two consecutive groups of OFDM symbols are configured in different subframes.

9. A base station comprising:
a processor; and
a memory having stored thereon a computer program which, when executed on the processor, causes the processor to:
configure User Equipment (UE)-specific Reference Signal (UE-RS) corresponding to a set of antenna ports in two or more groups of Orthogonal Frequency Division Multiplexing (OFDM) symbols on a short Physical Downlink Sharing CHannel (sPDSCH), wherein:
indices of subcarriers in frequency domain used for UE-RS transmission are fully different between at least two consecutive groups of OFDM symbols in time domain; and short Transmission Time Intervals (sTTIs) in the time domain used for UE-RS transmission are different between the at least two consecutive groups of OFDM symbols; and transmit the UE-RS to a user equipment.

10. A method in a user equipment, comprising:

receiving User Equipment (UE)-specific Reference Signal (UE-RS) from a base station, where the UE-RS corresponding to a set of antenna ports are configured in two or more groups of Orthogonal Frequency Division Multiplexing (OFDM) symbols on a short Physical Downlink Sharing CHannel (sPDSCH), wherein:

indices of subcarriers in frequency domain used for UE-RS transmission are fully different between at least two consecutive groups of OFDM symbols in time domain; and short Transmission Time Intervals (sTTIs) in the time domain used for UE-RS transmission are different between the at least two consecutive groups of OFDM symbols; and performing channel estimation based on the received UE-RS.

11. The method of claim 10, wherein a number of the subcarriers used for UE-RS transmission in each group of OFDM symbols is dependent on a length of an sTTI to which the group of OFDM symbols belongs.

12. The method of claim 11, wherein for a first group of OFDM symbols in a first sTTI having a longer length and a second group of OFDM symbols in a second sTTI having a shorter length, a larger number of subcarriers is configured for UE-RS transmission in the first group of OFDM symbols than the second group of OFDM symbols.

13. The method of claim 10, wherein the subcarriers used for UE-RS transmission in each group of OFDM symbols are evenly distributed.

14. The method of claim 10, wherein the at least two consecutive groups of OFDM symbols are in one and a same slot.

15. The method of claim 14, wherein different numbers of subcarriers are configured for UE-RS transmission in the at least two consecutive groups of OFDM symbols.

16. The method of claim 10, wherein the at least two consecutive groups of OFDM symbols are in different slots.

17. The method of claim 10, wherein the at least two consecutive groups of OFDM symbols are configured in different subframes.

18. A user equipment (UE) comprising:

a processor; and a memory having stored thereon a computer program which, when executed on the processor, causes the processor to:

receive UE-specific Reference Signal (UE-RS) from a base station, where the UE-RS corresponding to a set of antenna ports are configured in two or more groups of Orthogonal Frequency Division Multiplexing (OFDM) symbols on a short Physical Downlink Sharing CHannel (sPDSCH), wherein:

indices of subcarriers in frequency domain used for UE-RS transmission are fully different between at least two consecutive groups of OFDM symbols in time domain; and short Transmission Time Intervals (sTTIs) in the time domain used for UE-RS transmission are different between the at least two consecutive groups of OFDM symbols; and perform channel estimation based on the received UE-RS.

* * * * *